United States Patent [19]
Wong

[11] Patent Number: 4,925,741

[45] Date of Patent: May 15, 1990

[54] GETTER WIRE

[75] Inventor: James Wong, Wayland, Mass.

[73] Assignee: Composite Materials Technology, Inc., Shrewsbury, Mass.

[21] Appl. No.: 363,634

[22] Filed: Jun. 8, 1989

[51] Int. Cl.[5] .......... C22F 1/18; B32B 15/02; H01J 19/70; H01J 61/26

[52] U.S. Cl. .......... 428/661; 428/660; 428/662; 428/664; 428/665; 428/941; 148/11.5 F; 148/11.5 Q; 313/553

[58] Field of Search .......... 428/607, 649, 660, 661, 428/662, 663, 664, 665, 941, 610; 148/11.5 Q, 11.5 F; 313/553, 558, 559

[56] References Cited

U.S. PATENT DOCUMENTS

| | | | |
|---|---|---|---|
| 1,190,412 | 7/1916 | Hudson | 428/661 |
| 2,075,122 | 3/1937 | Loewe et al. | 313/558 |
| 2,304,412 | 12/1942 | Kern et al. | 313/558 |
| 2,321,910 | 6/1943 | Hays | 313/558 |
| 2,417,459 | 3/1947 | Eitel et al. | 428/661 |
| 2,477,279 | 7/1949 | Anderson | 428/660 |
| 2,486,436 | 11/1949 | Rothstein | 313/558 |
| 2,536,673 | 1/1951 | Widell | 428/660 |
| 2,560,933 | 7/1951 | Chun et al. | 313/558 |
| 2,792,517 | 5/1957 | Holland | 313/553 |
| 2,794,932 | 6/1957 | Voreaux | 313/553 |
| 2,814,748 | 11/1957 | Cox | 313/558 |
| 2,948,607 | 8/1960 | Wagener | 313/553 |
| 2,960,618 | 11/1960 | Waer | 313/553 |
| 3,190,771 | 6/1965 | Molean et al. | 428/661 |
| 3,580,734 | 5/1971 | Ciriack et al. | 428/661 |
| 3,620,645 | 11/1971 | Porta et al. | 428/661 |
| 3,724,049 | 4/1973 | Biguenet | 428/661 |
| 3,993,453 | 11/1976 | Ross et al. | 428/660 |
| 4,806,828 | 2/1989 | Hurst | 313/558 |

FOREIGN PATENT DOCUMENTS

| | | | |
|---|---|---|---|
| 640499 | 7/1950 | United Kingdom | 313/558 |
| 995821 | 6/1965 | United Kingdom | 313/558 |
| 2142044A | 1/1985 | United Kingdom | 428/661 |

*Primary Examiner*—John J. Zimmerman

*Attorney, Agent, or Firm*—Hayes, Soloway, Hennessey & Hage

[57] ABSTRACT

A getter wire is made by wrapping alternate layers of getter metal and refractory metal around an ingot of refractory metal. The composite ingot thus formed is reduced to wire, preferably by extrusion and drawing. The multi layers of refractory and getter metals can then be heated to form an alloy of the two metals from which the getter is evaporated during use. A preferred combination is tantalum as refractory and titanium as getter.

8 Claims, 1 Drawing Sheet

GETTER WIRE

BACKGROUND OF THE INVENTION

The present invention relates to the manufacture of getter wires for removing gaseous impurities such as oxygen, nitrogen, carbon monoxide, carbon dioxide, hydrogen and water vapor from evacuated spaces. Such wires are used in sealed evacuated devices such as cathode-ray tubes, power tubes and in various vacuum processes where a getter is flashed during the last stage of evacuation of various devices to clean up residual oxygen, nitrogen and other reactive gases. Usual getter materials are the reactive metals titanium, zirconium, hafnium and barium. Such wires may also be used as sources of metal vapors for thin film technology as well as merely as getters. In order to evaporate such metals, they are normally heated to a temperature in excess of 1800° C. where the vapor pressure of the getter metal is extremely high. Since such temperatures are above the melting point of titanium and zirconium, the getter metal must be supported during its heating. One present commercial method of doing this is the provision of an alloy of the getter metal, such as titanium, with a refractory metal, such as tantalum (see U.S. Pat. No. 2,948,607 Wagener, Aug. 9, 1960) commercially available getter alloy is one of tantalum containing 20 percent (by weight) titanium. Such a wire can be can be heated to 2000° C. and still retain its strength characteristics.

The manufacture of tantalum—20 percent titanium alloy is quite difficult. In arc melting, the large difference in melting point between tantalum and titanium (3000° C. vs. 1680° C.) and the high vapor pressure of titanium at the melting point of tantalum both cause segregation of tantalum (unmelted tantalum) and nonuniformity as well as accurate control of the percent titanium due to vaporization of titanium metal during melting. While these alloys can be made by powder metallurgical means, powders contain high amounts of interstitial impurities such as C, $O_2$, $N_2$ which usually results in brittleness and subsequent fabrication difficulties.

SUMMARY OF THE INVENTION

In the present invention the getter wire is made of a getter metal and a refractory metal such as tantalum, niobium, molybdenum, or tungsten (and alloys thereof) by providing a core of the refractory metal and wrapping around the core alternate thin layers of the getter metal (e.g. titanium) and the refractory metal (e.g. tantalum) to provide multiple layers (at least 2 layers of each metal) to build up an ingot. This composite ingot is then preferably encased in a soft extrusion metal such as copper and extruded to a rod which can then be drawn down to a wire on the order of ten thousandths of an inch (0.010″) in diameter. With a starting ingot of 2 inches in diameter; this is a reduction of 40,000 to 1. Accordingly, each titanium and tantalum layer thickness is reduced by a factor of 200 to 1. When the starting tantalum and titanium sheets are quite thin, on the order of five thousandths of an inch, it is apparent that the final tantalum titanium layers are only 25 micro inches (0.000025 inches) thick.

The final wire will have an outer titanium content depending upon the relative weights of the titanium and tantalum sheet. Where there is approximately equal volume of titanium to tantalum the wire will have about 25 percent titanium content by weight. The amount of titanium can also be increased in the outer layers to increase the life of each getter.

This wire can then be annealed, if desired, with a temperature on the order of 1500° C., below the melting point of titanium, to form a uniform tantalum-titanium alloy throughout the cross section of the wire. However, it is not necessary to form this solid solution alloy since use of the wire at gettering temperature will rapidly create a uniform alloy. At a temperature in excess of 1800° C. the titanium would diffuse rapidly through the tantalum body.

SPECIFIC DESCRIPTION OF THE INVENTION

Referring now to the accompanying drawings, the steps involved in the preparation of the product of the present invention and the mechanical structure of the product are shown in the accompanying drawings wherein.

Figure 1:
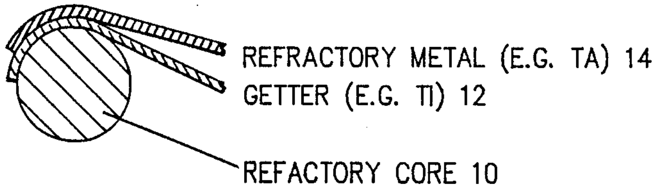
FIG. 1 is a diagramatic, schematic sectional view of the preparation of the starting ingot.
Figure 2:
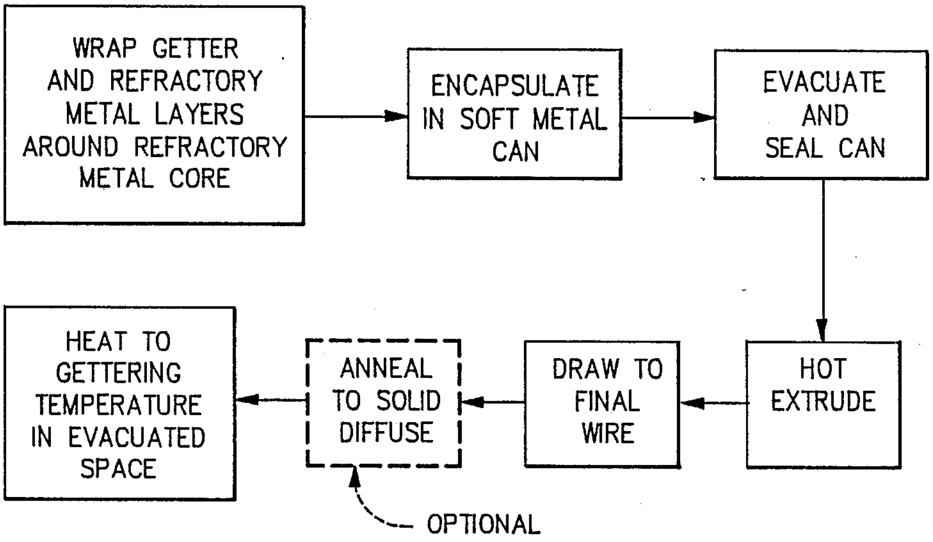
FIG. 2 is a flow sheet of the preferred process steps of the invention.

Referring now to FIG. 1, the invention is practiced by starting with, in a preferred embodiment, a tantalum core 10, for example a tantalum rod about 1 inch in diameter. Surrounding this core 10 are wrapped alternate layers of titanium foil 12 and tantalum foil 14. These layers are preferably on the order of 0.005 to 0.015 inch thick. In a preferred embodiment 25 layers each of alternate titanium and tantalum foil are wrapped around the tantalum core 10 to give a final thickness of about 1.80 inches. The resulting composite ingot is then inserted in a copper extrusion can having an outer wall of 0.1 inch. This copper extrusion can is then evacuated, sealed and the ingot is extruded at 800° C. to a rod of 0.500 inch diameter. This rod is then drawn to a final wire thickness (ignoring the copper) of 0.010 inch. The copper is then removed by etching and the wire is ready for use as a getter. The mechanical method used for processing the wire, as described above, is essentially identical to that for forming superconducting materials.

While one preferred embodiment of the invention is described above, it may be considerably modified, as will be apparent to one of ordinary skill in the art. For example, another getter metal such as zirconium or hafnium can be used in place of titanium or titanium hafnium zirconium alloys can be employed. Other refractory metals such as niobium, molybdenum or tungsten may be used. The important criteria are that the getter metal be soluble in the refractory metal and be able to diffuse to the surface of the solid composite getter wire during the high temperature gettering operation. Thus, essentially all of the getter metal can be evaporated from the refractory metal wire during the gettering operation. It is also important that the getter metal not form a low melting point eutectic with the refractory metal, thus weakening the getter wire. For example, titanium and tantalum form a continuous series of solid solution in the beta phase at all concentrations.

The important point is that by this method, alloys of metals with widely different melting points and vapor pressure can be made via a solid state processing technique. This is accomplished by mechanically reducing combined separate layers of these metals to very small dimensions (e.g., less than 0.0001 inch thick). These dimensions are so small that, with very low annealing or alloying heat treatments, even during wire processing, a uniform homogeneous alloy can be produced by solid state diffusion.

The extrusion and subsequent drawing of the wire is much easier when the components are essentially in the pure condition. Thus, it is only after completion to final wire size that a complete homogeneous alloy is made by a final thermal heat treatment. The use of a solid pure metal core, such as tantalum, retains the mechanical and electrical stability during the gettering action more so than for a completely alloyed wire where the percent of titanium is continuously being depleted. The core can be considered as an inert or passive component. This is essential for long life applications.

While one preferred embodiment of the invention has been described above, numerous modifications thereof can be utilized without departing from the spirit of the invention. For example, alloys of the various getter and refractory metals can be employed so long as the alloying constituents do not detract from the basic functions necessary for the pure metal.

I claim:

1. A product useful for manufacturing a wire for evaporating a reactive metal for use as a source of reactive metal vapors and as a getter wire comprising a refractory metal core and a plurality of layers of a getter metal interspersed with layers of a refractory metal surrounding the core, the reactive metal being selected from the group consisting of titanium, zirconium, hafnium and barium and the refractory metal being selected from the group of tantalum, niobium, molybdenum and tungsten and alloys thereof.

2. The product of claim 1 wherein each said layer is less than 0.001 inch thick.

3. The product of claim 1 wherein said plurality of layers has been heated to a sufficiently high temperature to partially diffuse said reactive metal into said refractory metal.

4. The product of claim 3 wherein the outer portion thereof is essentially comprised of a solid solution of reactive metal in refractory metal.

5. The product of claim 1 wherein the reactive metal comprises titanium and the refractory metal comprises tantalum.

6. The product of claim 5 wherein the wire has been heated to a sufficiently high temperature to form a partial solid solution of titanium in tantalum.

7. The process of manufacturing a product useful as a getter wire comprising the steps of wrapping a refractory metal core with a plurality of layers of a getter metal interspersed with layers of a refractory metal surrounding the core, the getter metal being selected from the group consisting of titanium, zirconium, hafnium and barium and the refractory metal being selected from the group of tantalum, niobium, molybdenum and tungsten, mechanically consolidating and reducing said core and overlying layers to a wire and heating said wire to a sufficiently high temperature to diffuse said getter metal into said refractory metal.

8. A product useful for manufacturing a wire for evaporating a reactive metal for use as a source of reactive metal vapors and as a getter wire, comprising a refractory metal support and a plurality of layers of a getter metal interspersed with layers of a refractory metal surrounding the support, the reactive metal being selected from the group consisting of titanium, zirconium, hafnium and barium and the refractory metal being selected from the group of tantalum, niobium, molybdenum and tungsten and alloys thereof.

* * * * *